UNITED STATES PATENT OFFICE.

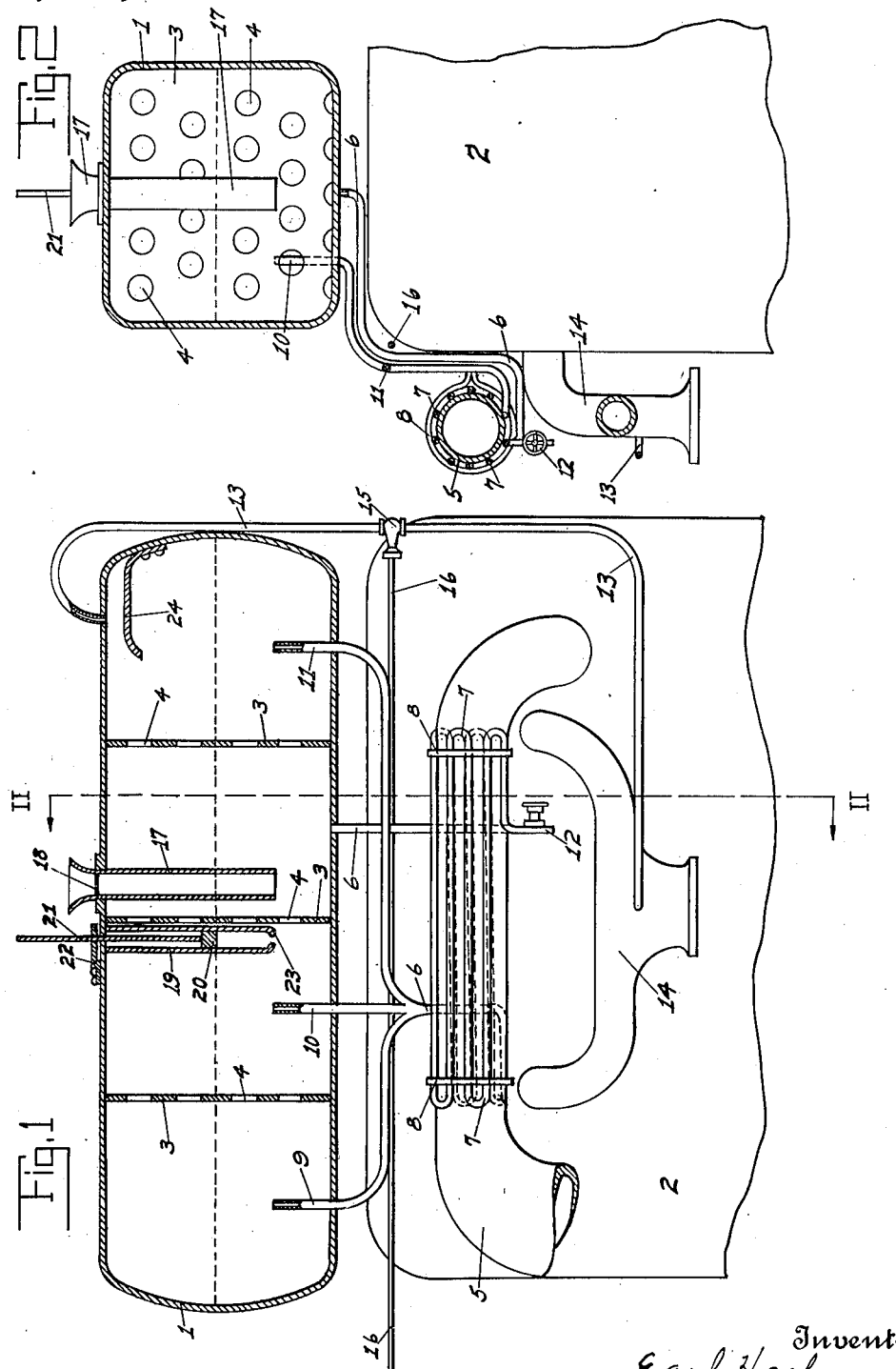

EARL HASBROUCK AND CHARLES E. WHITE, OF WALLKILL, NEW YORK.

FUEL-SAVER AND DECARBONIZER.

1,280,997.   Specification of Letters Patent.   Patented Oct. 8, 1918.

Application filed December 7, 1917. Serial No. 205,984.

*To all whom it may concern:*

Be it known that we, EARL HASBROUCK and CHARLES E. WHITE, citizens of the United States, and residents of Wallkill, county of Ulster, and State of New York, have invented certain new and useful Improvements in Fuel-Savers and Decarbonizers, of which the following is a specification.

This invention relates to improvements in internal combustion engines and has for its object the provision of means for economizing fuel and for preventing the deposition of carbon in the cylinders in the operation of engines of this type.

In the drawings, Figure 1 is a side elevation, partly in vertical section, showing an engine equipped with the fuel economizing and carbonization preventing means; and Fig. 2 is a vertical section on the line II—II of Fig. 1, the engine casing being shown in end elevation.

Referring to the drawings by numerals, 1 designates a steam or vapor generator supported above the engine 2 in any suitable manner. The vapor generator is provided with a series of transversely extending perforated partitions or plates 3, the upper half of the vapor generator or tank 1 forming a steam or vapor drum. The plates 3 are provided with perforations 4, permitting water and vapor to pass through the plates, but are adapted to prevent excessive surging of the water in the generator.

The water in the generator tank 1 is adapted to be heated from the exhaust pipe 5 of the engine 2 by means of a circulating system comprising a pipe 6 connected at one end with the bottom of the tank 1, preferably substantially centrally thereof, and bent to form an annular series of loops 7 extending about the exhaust pipe 5 and held thereagainst by means of suitable clamping bands 8. The opposite end of pipe 6 is connected with three branch pipes 9, 10 and 11 which extend upwardly into the tank 1 at points spaced longitudinally of said tank and to points above the bottom thereof and preferably below or substantially in alinement with the minimum water line in the tank. A drain cock 12 is connected with the pipe 6 in order that the water in tank 1 and the pipe system may be drained therefrom when desired.

The aqueous vapor generated when the engine is running will accumulate in the upper portion or vapor drum of tank 1 and will be drawn off from said drum through a pipe 13 by the suction of the engine 2. The pipe 13 is connected at one end with the upper portion or vapor drum of tank 1 and is connected at its other end with the intake manifold 14 of the engine 2. It will thus be seen that a quantity of aqueous vapor will be mingled with the gaseous fuel drawn into the engine cylinders through the intake manifold 14. The quantity of vapor drawn through pipe 13 may be regulated by means of a suitable valve 15 interposed in said pipe and operable from the dashboard of a motor vehicle or other point by means of an operating rod 16.

The supply of water in tank 1 may be replenished through a filling tube 17, preferably having a suitable screen 18 therein and formed with a flaring or funnel-shaped upper end. The lower end of the tube 17 extends below the normal water line (indicated by dotted lines) to the minimum water line of tank 1.

The filling tube 17 also serves to admit air into the generator, said air being heated as it passes downwardly through the tube 17 and rises through the heated water in the generator.

A suitable water gage is provided to indicate the water level in tank 1. This water gage may be of any suitable construction. As shown, it comprises a tube or cylinder 19 extending to or below the minimum water line and having an open lower end preferably extending to the same level as the lower end of tube 17. A piston or float 20 is mounted in the tube 19 and a stem or indicator rod 21 is held at its lower end to said piston. The rod 21 extends upwardly through tube 19 and passes through a suitable aperture in an indicator plate 22 held to the top of tank 1. The lower end of tube 19 is provided with an annular internal stop flange 23 for the piston or float 20. A suitable baffle plate 24 is preferably held to one end wall of tank 1 and extends inwardly past the inlet end of pipe 13 to prevent water from splashing or running into pipe 13.

What we claim is:

1. The combination with an internal combustion engine having an intake manifold and an exhaust pipe, of a water tank supported at a higher level than the exhaust pipe and having a vapor collecting space therein above the water level, a water circulating and heating pipe having its off-take end communicating with the bottom of said tank and its outlet end communicating with said tank above the bottom thereof, said pipe being coiled intermediate its ends about the exhaust pipe at a point below the level of the bottom of the tank, and a vapor conduit connecting the vapor collecting space of said tank with the intake manifold.

2. The combination with an internal combustion engine having an intake manifold and a horizontally extending exhaust pipe, of a water tank supported above the level of said exhaust pipe and having a vapor collecting space in the upper portion thereof, a water circulating and heating pipe having its off-take end communicating with the bottom of said tank and its outlet end communicating with said tank above the bottom thereof and below the water line, said pipe being bent back and forth intermediate its ends to form an annular series of horizontally extending loops about the exhaust pipe, a drain cock connected with the lowermost bend of said pipe whereby said tank and circulating pipe may be drained of water, and a vapor conduit connecting the vapor space of said tank with the intake manifold.

3. The combination with an internal combustion engine having an intake manifold and a horizontally extending exhaust pipe, of a water tank supported above the level of said exhaust pipe and having a vapor collecting space in the upper portion thereof, a water circulating and heating pipe having its off-take end communicating with the bottom of said tank and its outlet end communicating with said tank above the bottom thereof and below the water line, said pipe being bent back and forth intermediate its ends to form an annular series of horizontally extending loops about the exhaust pipe, a drain cock connected with the lowermost bend of said pipe whereby said tank and circulating pipe may be drained of water, a vapor conduit connecting the vapor space of said tank with the intake manifold, and a baffle plate held to the inner side of said tank above the water line and interposed between the off-take end of said vapor conduit and the body of water in the tank.

4. The combination with an internal combustion engine having an intake manifold and an exhaust pipe, of a water tank supported at higher level than the exhaust pipe and having a vapor collecting space therein above the water leved, a water circulating and heating pipe having its off-take end communicating with the bottom of said tank and its outlet end communicating with said tank above the bottom thereof, said pipe being coiled intermediate its ends about the exhaust pipe at a point below the level of the bottom of the tank, a plurality of spaced perforated partitions extending transversely of said tank from top to bottom thereof, a vapor conduit connecting one end of the tank above the water line with the intake manifold, and a baffle plate held to the inner side of the tank and interposed between the off-take end of said vapor conduit and the body of water in the tank.

5. The combination with an internal combustion engine having an intake manifold and an exhaust pipe, of a water tank supported at a higher level than the exhaust pipe and having a vapor collecting space therein above the water level, a water circulating and heating pipe having its off-take end communicating with the bottom of said tank and its outlet end communicating with said tank above the bottom thereof, said pipe being coiled intermediate its ends about the exhaust pipe at a point below the level of the bottom of the tank, a plurality of spaced perforated partitions extending transversely of said tank from top to bottom thereof, a vapor conduit connecting one end of the tank above the water line with the intake manifold, a baffle plate held to the inner side of the tank and interposed between the off-take end of said vapor conduit and the body of water in the tank, and a water and air supply tube extending vertically through the top of said tank and open at both ends, the lower end of said tube depending into said tank to a point below the water line.

6. The combination with an internal combustion engine having an intake manifold and an exhaust pipe, of a water tank supported at a higher level than the exhaust pipe and having a vapor collecting space therein above the water level, a water circulating and heating pipe having its off-take end communicating with the bottom of said tank and its outlet end communicating with said tank above the bottom thereof, said pipe being coiled intermediate its ends about the exhaust pipe at a point below the level of the bottom of the tank, a plurality of spaced perforated partitions extending transversely of said tank from top to bottom thereof, a vapor conduit connecting one end of the tank above the water line with the intake manifold, a baffle plate held to the inner side of the tank and interposed between the off-take end of said vapor conduit and the body of water in the tank, a water and air supply tube extending vertically through the top of said tank and open at both ends, the lower end of said tube depending into said tank to a point below the water line, and a valve in said vapor conduit for controlling the passage of vapor therethrough to the intake manifold.

In testimony whereof we hereunto affix our signatures this 30 day of November, 1917.

EARL HASBROUCK.
CHARLES E. WHITE.